(12) United States Patent
Fischer et al.

(10) Patent No.: US 12,053,870 B2
(45) Date of Patent: Aug. 6, 2024

(54) IMPACT TOOL

(71) Applicant: MILWAUKEE ELECTRIC TOOL CORPORATION, Brookfield, WI (US)

(72) Inventors: Scott R. Fischer, Menomonee Falls, WI (US); Evan Brown, Milwaukee, WI (US); Michael R. Sande, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/167,615

(22) Filed: Feb. 4, 2021

(65) Prior Publication Data
US 2021/0237249 A1  Aug. 5, 2021

Related U.S. Application Data

(60) Provisional application No. 62/969,849, filed on Feb. 4, 2020.

(51) Int. Cl.
*B25D 17/24* (2006.01)

(52) U.S. Cl.
CPC ........ *B25D 17/24* (2013.01); *B25D 2250/121* (2013.01)

(58) Field of Classification Search
CPC ..... B25D 17/24; B25D 2250/121; B25F 5/00; B25F 5/006; B23Q 11/0032; H04B 1/3883

(Continued)

(56) References Cited

U.S. PATENT DOCUMENTS 3,681,738 A    8/1972  Friend
3,989,331 A    11/1976 Hanlon
(Continued)

FOREIGN PATENT DOCUMENTS

CN    202684816 U    1/2013
CN    203843800 U    9/2014
(Continued)

OTHER PUBLICATIONS

SmartBolts; "5 Causes of Loose Bolts—and 5 Ways to Prevent Them"; Insight; Website: http://www.smartbolts.com/insights/loose-bolts-causes-ways-prevent/ (Year: 2017).*

(Continued)

*Primary Examiner* — Thanh K Truong
*Assistant Examiner* — David G Shutty
(74) *Attorney, Agent, or Firm* — Michael Best & Friedrich LLP

(57) ABSTRACT

An impact tool includes an electric motor and a housing containing the electric motor, the housing including a battery receptacle. The battery receptacle includes an isolation member configured to selectively and detachably couple to a battery pack to electrically connect the battery pack to the electric motor. The isolation member includes opposed rails configured to be received into sliding engagement with channels formed in the housing. The battery receptacle also includes an elastomeric damper supported within the housing. During operation of the impact tool, the isolation member is configured to translate relative to the housing and impact the elastomeric damper which, in turn, is configured to attenuate the transmission of vibration from the housing to the battery pack.

15 Claims, 12 Drawing Sheets

(58) Field of Classification Search
USPC ............................................................ 173/117
See application file for complete search history.

(56) References Cited

U.S. PATENT DOCUMENTS

| | | | |
|---|---|---|---|
| 4,257,668 A | 3/1981 | Ellis, Jr. | |
| 4,294,007 A | 10/1981 | Ellis, Jr. | |
| 4,790,218 A | 12/1988 | Cabrera | |
| 4,942,997 A | 7/1990 | Sinkunas et al. | |
| 5,131,853 A | 7/1992 | Meyer | |
| 5,184,767 A | 2/1993 | Estes | |
| 5,290,970 A | 3/1994 | Currie | |
| 5,352,125 A | 10/1994 | Banakis et al. | |
| 5,653,601 A | 8/1997 | Martucci et al. | |
| 6,290,555 B1 | 9/2001 | Nubuyuki et al. | |
| 6,502,949 B1 * | 1/2003 | Horiyama | B23Q 17/2404 |
| | | | 362/198 |
| 6,786,683 B2 | 9/2004 | Schaer et al. | |
| 6,935,437 B2 | 8/2005 | Izumisawa | |
| 7,182,150 B2 * | 2/2007 | Grossman | B23Q 37/00 |
| | | | 173/171 |
| 7,401,663 B2 | 7/2008 | Craven et al. | |
| 7,628,220 B2 | 12/2009 | Barezzani et al. | |
| 7,661,486 B2 * | 2/2010 | Turner | H01M 50/20 |
| | | | 173/217 |
| 7,766,097 B2 * | 8/2010 | Kondo | B25F 5/006 |
| | | | 173/171 |
| 8,062,060 B2 * | 11/2011 | Rejman | B25F 5/02 |
| | | | 439/527 |
| 8,230,607 B2 | 7/2012 | Limberg et al. | |
| 8,235,137 B2 | 8/2012 | Walker et al. | |
| 8,272,452 B2 | 9/2012 | Katou et al. | |
| 8,354,183 B2 * | 1/2013 | Konuma | B25F 5/02 |
| | | | 429/97 |
| 8,381,831 B2 | 2/2013 | Sekino et al. | |
| 8,627,900 B2 | 1/2014 | Oomori et al. | |
| 8,820,430 B2 | 9/2014 | Walker et al. | |
| 9,266,226 B2 | 2/2016 | Timmons | |
| 9,819,132 B2 * | 11/2017 | Peloquin | H02J 7/0044 |
| 9,908,229 B2 | 3/2018 | Wang | |
| 9,908,232 B2 | 3/2018 | Chen | |
| 10,286,529 B2 | 5/2019 | Kiyohara et al. | |
| 2002/0094907 A1 | 7/2002 | Elger | |
| 2008/0135272 A1 * | 6/2008 | Wallgren | H01M 50/202 |
| | | | 173/217 |
| 2011/0188232 A1 | 8/2011 | Friedman et al. | |
| 2012/0319508 A1 | 12/2012 | Oomori | |
| 2013/0033217 A1 | 2/2013 | Hirabayashi | |
| 2013/0284480 A1 | 10/2013 | Horie et al. | |
| 2014/0014385 A1 | 1/2014 | Kosugi et al. | |
| 2014/0262394 A1 | 9/2014 | Scott et al. | |
| 2014/0326477 A1 * | 11/2014 | Thorson | B25F 5/006 |
| | | | 173/171 |
| 2015/0266176 A1 | 9/2015 | Takeuchi et al. | |
| 2016/0354914 A1 | 12/2016 | Bartoszek et al. | |
| 2017/0310194 A1 | 10/2017 | Beyerl | |
| 2018/0054032 A1 | 2/2018 | Peloquin et al. | |
| 2018/0370014 A1 * | 12/2018 | Roehm | B25F 5/02 |
| 2019/0001477 A1 * | 1/2019 | Ullrich | B25F 5/00 |
| 2019/0044110 A1 | 2/2019 | Sheeks et al. | |
| 2019/0193223 A1 | 6/2019 | Thorson et al. | |
| 2019/0224819 A1 | 7/2019 | Kiyohara et al. | |
| 2020/0215679 A1 * | 7/2020 | Tamura | B25F 5/006 |
| 2020/0282540 A1 | 9/2020 | Bartoszek et al. | |
| 2021/0237249 A1 * | 8/2021 | Fischer | B25F 5/02 |

FOREIGN PATENT DOCUMENTS

| | | | |
|---|---|---|---|
| CN | 104175160 B | 4/2017 | |
| CN | 105215915 B | 4/2017 | |
| CN | 105437129 B | 4/2017 | |
| CN | 206122746 U | 4/2017 | |
| CN | 206702908 U | 12/2017 | |
| CN | 108430706 A | 8/2018 | |
| CN | 109301539 A | 2/2019 | |
| CN | 109500432 A | 3/2019 | |
| CN | 106211628 B | 5/2019 | |
| CN | 209139897 U | 7/2019 | |
| DE | 19738092 C1 | 12/1998 | |
| DE | 102013201504 A1 * | 7/2014 | B25F 5/006 |
| DE | 202017105258 U1 * | 10/2017 | H01M 2/10 |
| DE | 102016118805 A1 | 4/2018 | |
| EP | 0166817 B1 | 8/1987 | |
| EP | 2000267 A2 * | 12/2008 | B25F 5/006 |
| GB | 2432036 A * | 5/2007 | B25D 17/043 |
| JP | 2005169533 A | 6/2005 | |
| JP | 2008183691 A | 8/2008 | |
| JP | 2015074062 A | 4/2015 | |
| JP | 2015074062 A * | 4/2015 | B25F 5/02 |
| JP | 2016097498 A | 5/2016 | |
| JP | 2017080853 A | 5/2017 | |
| WO | 2007135107 A1 | 11/2007 | |
| WO | 2017102515 A1 | 6/2017 | |

OTHER PUBLICATIONS

International Search Report and Written Opinion for Application No. PCT/US2021/016577 dated Jun. 1, 2021 (11 pages).
Ingersoll Rand, "Air Impact Wrench 2850MAX and 2850MAX-6," Product Information, Edition 3, Feb. 2018, 32 pages.
Ingersroll Rand, "285B Series Air Impact Wrench—Exploded View," Edition 7, Jan. 2014, 2 pages.
Ingersroll Rand, "2850MAX Series Air Impactools™—Exploded View" Edition 3, Feb. 2018, 2 pages.
Ingersroll Rand, "1" D-Handle Impact Wrench 2850MAX and 2850MAX-6, Informational Flyer, 2018, 2 pages.
Ingersoll Rand, "Air Impact Wrench Series 285B and 295A," Product Information, Edition 5, Jan. 2014, 36 pages.
Extended European Search Report for Application No. 21750502.3 dated Jun. 3, 2024 (8 pages).

* cited by examiner

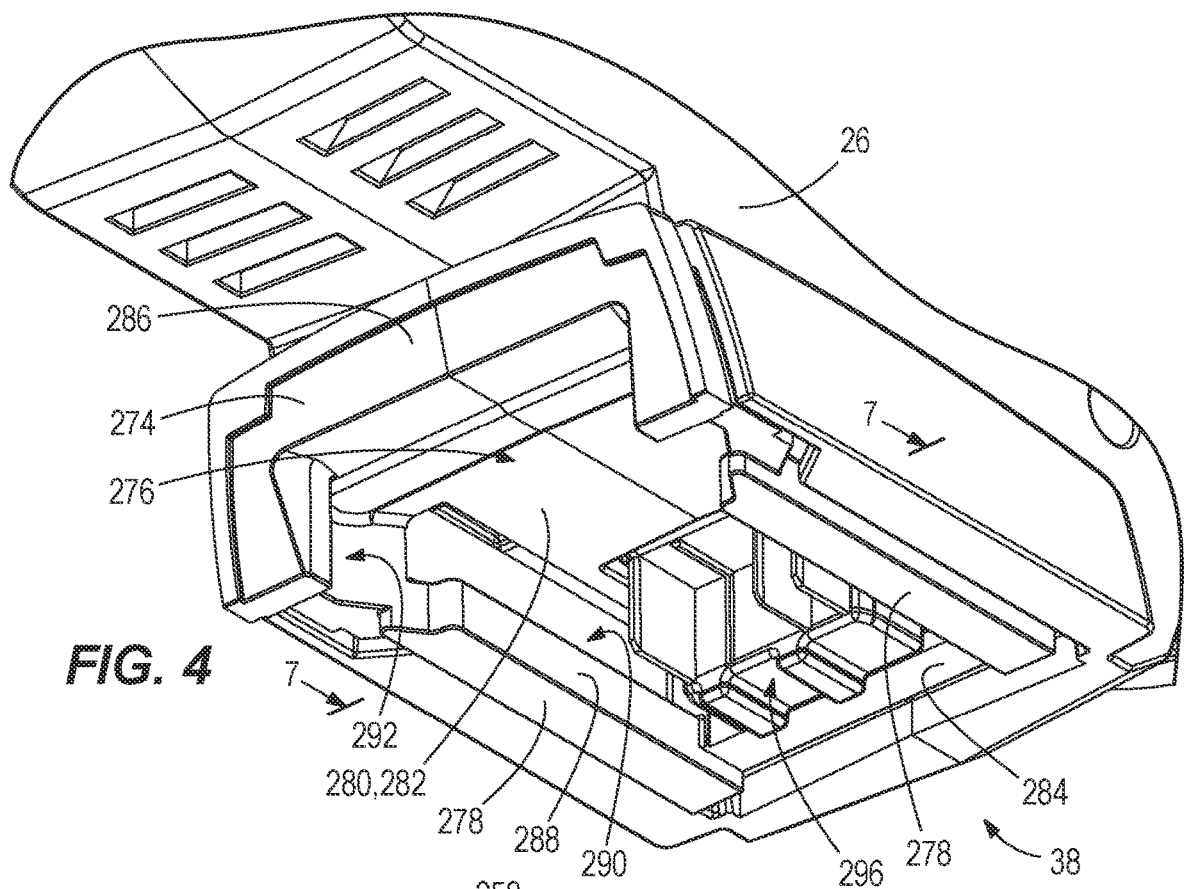
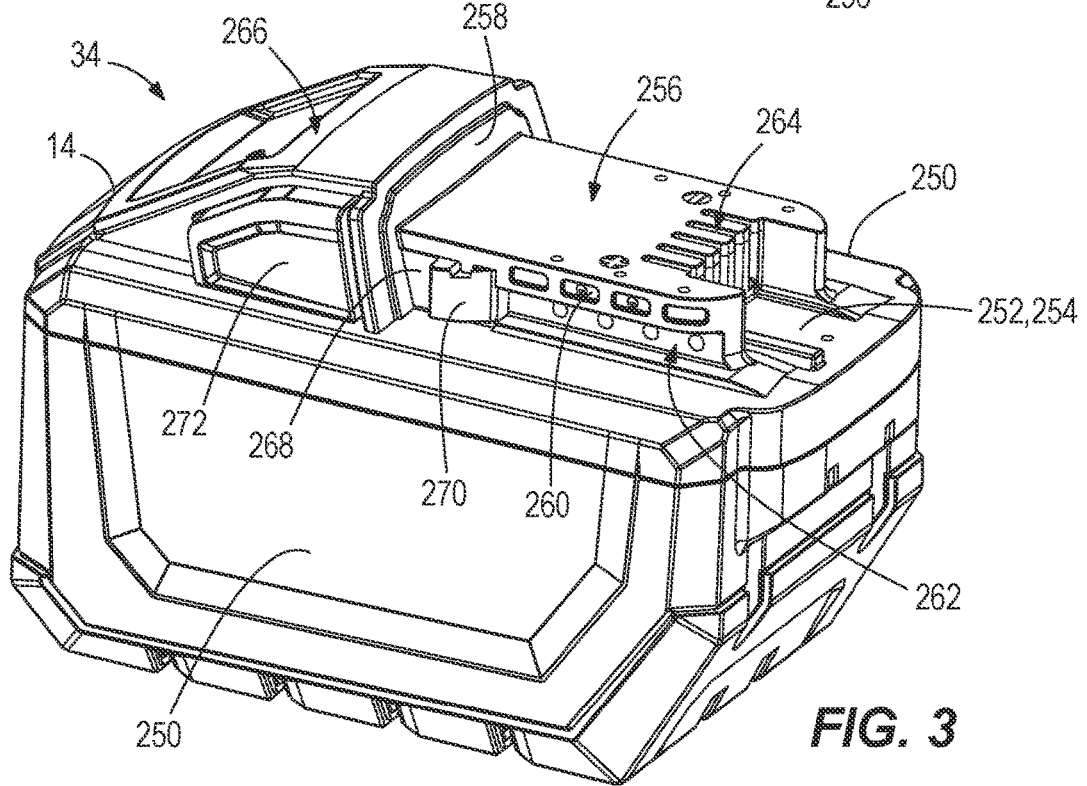

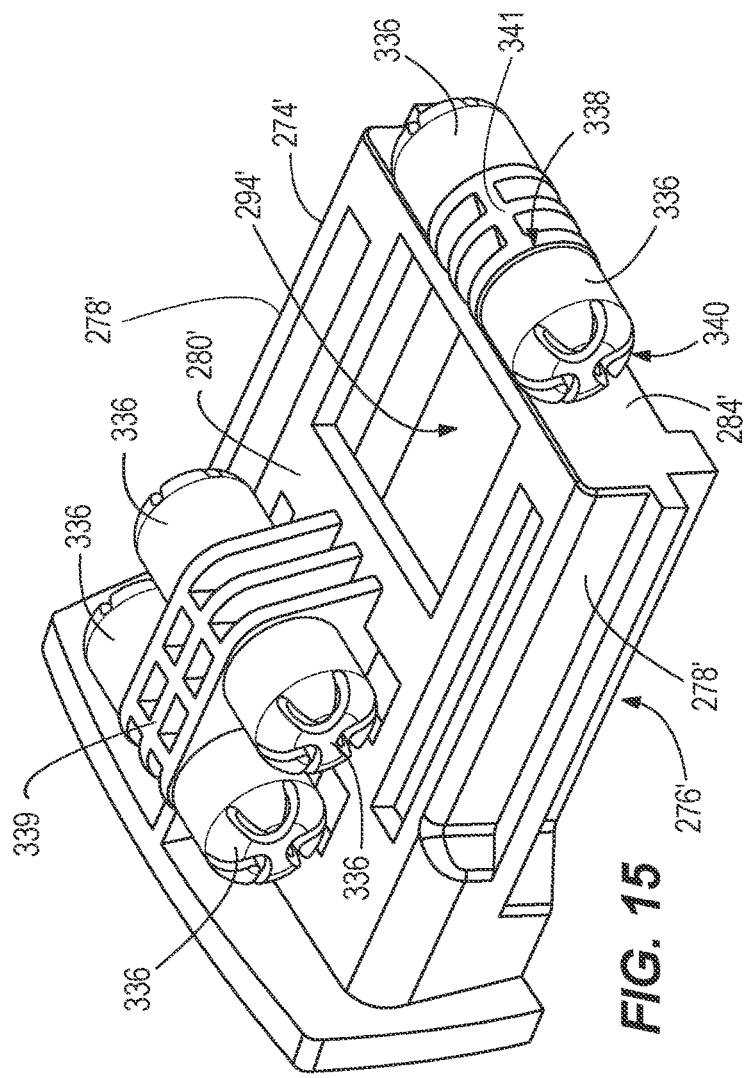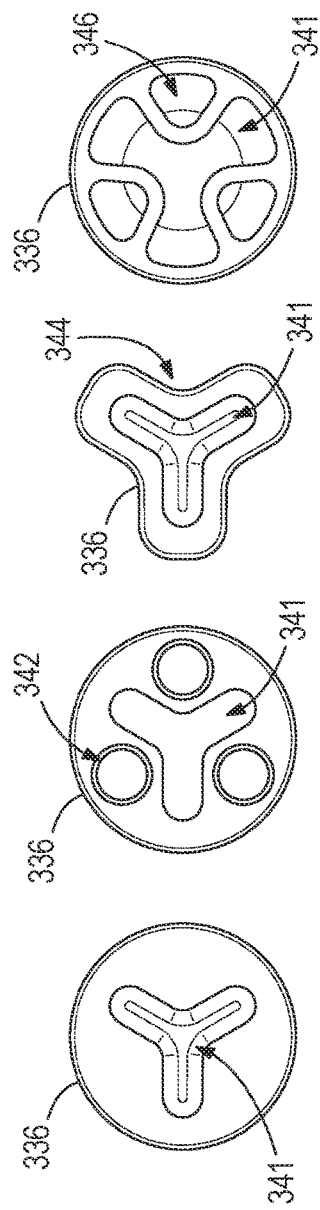

IMPACT TOOL

CROSS-REFERENCE TO RELATED APPLICATIONS

This application claims priority to U.S. Provisional Patent Application No. 62/969,849, filed Feb. 4, 2020, the entire content of which is hereby incorporated by reference.

FIELD OF THE INVENTION

The present invention relates to power tools, and more specifically to impact tools.

BACKGROUND OF THE INVENTION

Impact tools or wrenches are typically utilized to provide a striking rotational force, or intermittent applications of torque, to a tool element or workpiece (e.g., a fastener) to either tighten or loosen the fastener. As such, impact wrenches are typically used to loosen or remove stuck fasteners (e.g., an automobile lug nut on an axle stud) that are otherwise not removable or very difficult to remove using hand tools.

SUMMARY OF THE INVENTION

The present invention provides, in one aspect, an impact tool including an electric motor, a housing containing the electric motor, and a battery receptacle. The battery receptacle includes an isolation member configured to selectively and detachably couple to a battery pack to electrically connect the battery pack to the electric motor. The isolation member includes opposed rails configured to be received into sliding engagement with channels formed in the housing. The battery receptacle also includes an elastomeric damper supported within the housing. During operation of the impact tool, the isolation member is configured to translate relative to the housing and impact the elastomeric damper which, in turn, is configured to attenuate transmission of vibration from the housing to the battery pack.

The present invention provides, in another aspect, an impact tool including an electric motor, a housing containing the electric motor, and a battery receptacle. The battery receptacle includes an isolation member configured to selectively and detachably couple to a battery pack to electrically connect the battery pack to the electric motor. The isolation member includes opposed posts configured to be received into cup-shaped elastomeric dampers supported within the housing.

The present invention provides, in another aspect, an impact tool including a housing having a motor housing portion and a D-shaped handle portion coupled to the motor housing portion. The handle portion includes a grip spaced from the motor housing portion to define an aperture between the grip and the motor housing portion. The impact tool also includes an electric motor positioned within the motor housing portion and including a motor shaft, and a drive assembly configured to convert a continuous rotational input from the motor shaft to consecutive rotational impacts upon a workpiece. The impact tool further includes a first battery receptacle and a second battery receptacle each extending from the handle portion and each configured to selectively and detachably couple to a battery pack.

The present invention provides, in another aspect, an impact tool including an electric motor and a housing having a motor housing portion containing the electric motor, and a handle portion coupled to the motor housing portion. The impact tool also includes a U-shaped channel defined within the handle portion, an elastomeric damper received into the U-shaped channel, and a circuit board having at least three edges received into grooves formed in the elastomeric damper. The elastomeric damper is configured to attenuate vibration transmitted to the circuit board along a longitudinal direction of the housing, along a lateral direction of the housing perpendicular to the longitude direction, and along a vertical direction of the housing orthogonal to the longitudinal and lateral directions.

Other features and aspects of the invention will become apparent by consideration of the following detailed description and accompanying drawings.

BRIEF DESCRIPTION OF THE DRAWINGS

FIG. 3 is a perspective view of a battery pack operable with the impact wrench of FIG. 1A.

FIG. 4 is a perspective view of a battery receptacle of the impact wrench of FIG. 1A.

FIG. 15 is a perspective view of an isolation member of the receptacle of FIG. 13.

FIGS. 16A-16D are side views of alternative embodiments of dampers of the battery receptacle of FIG. 13.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
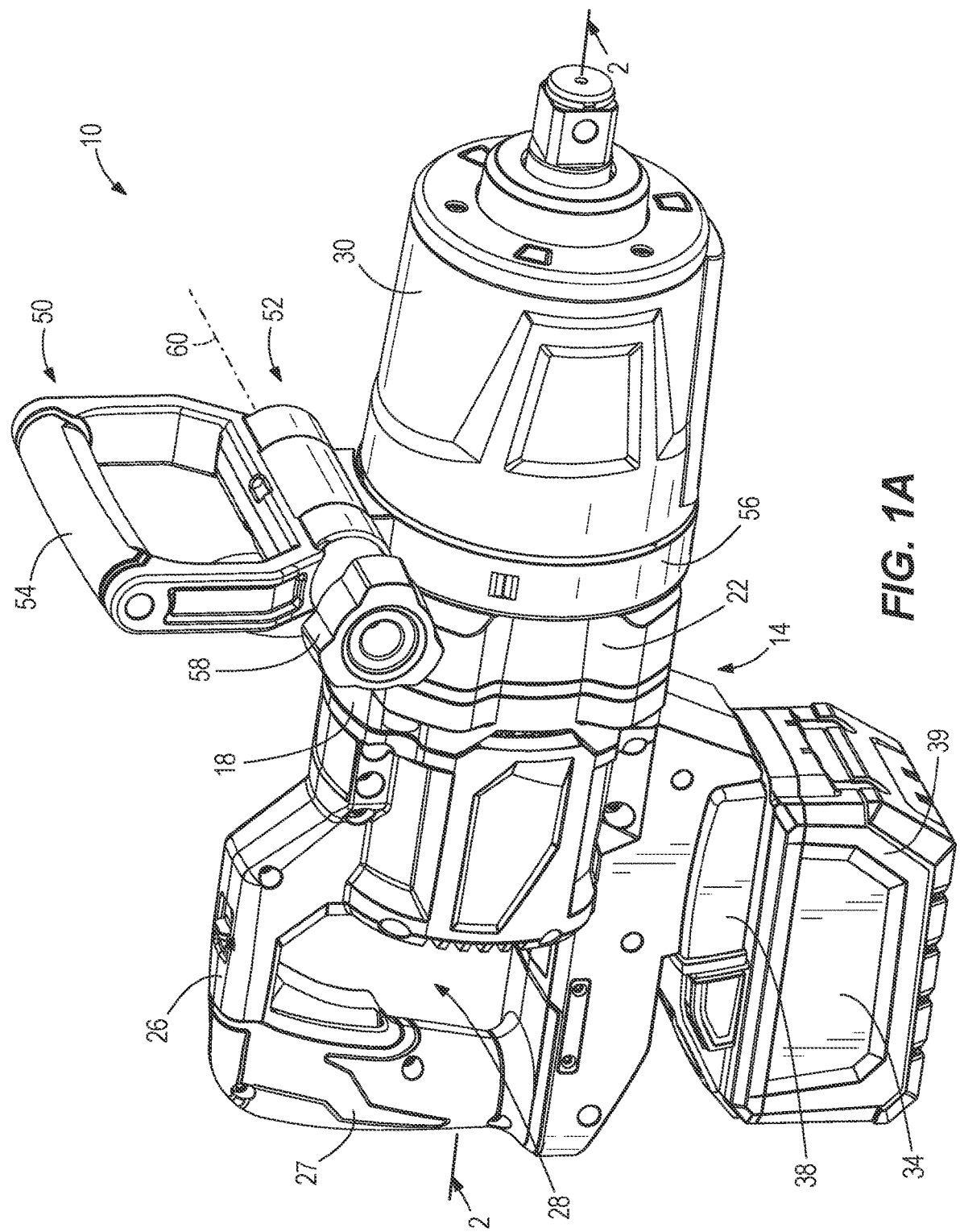
FIGS. 1A and 1B are perspective views of an impact wrench according to one embodiment.
Figure 1B:
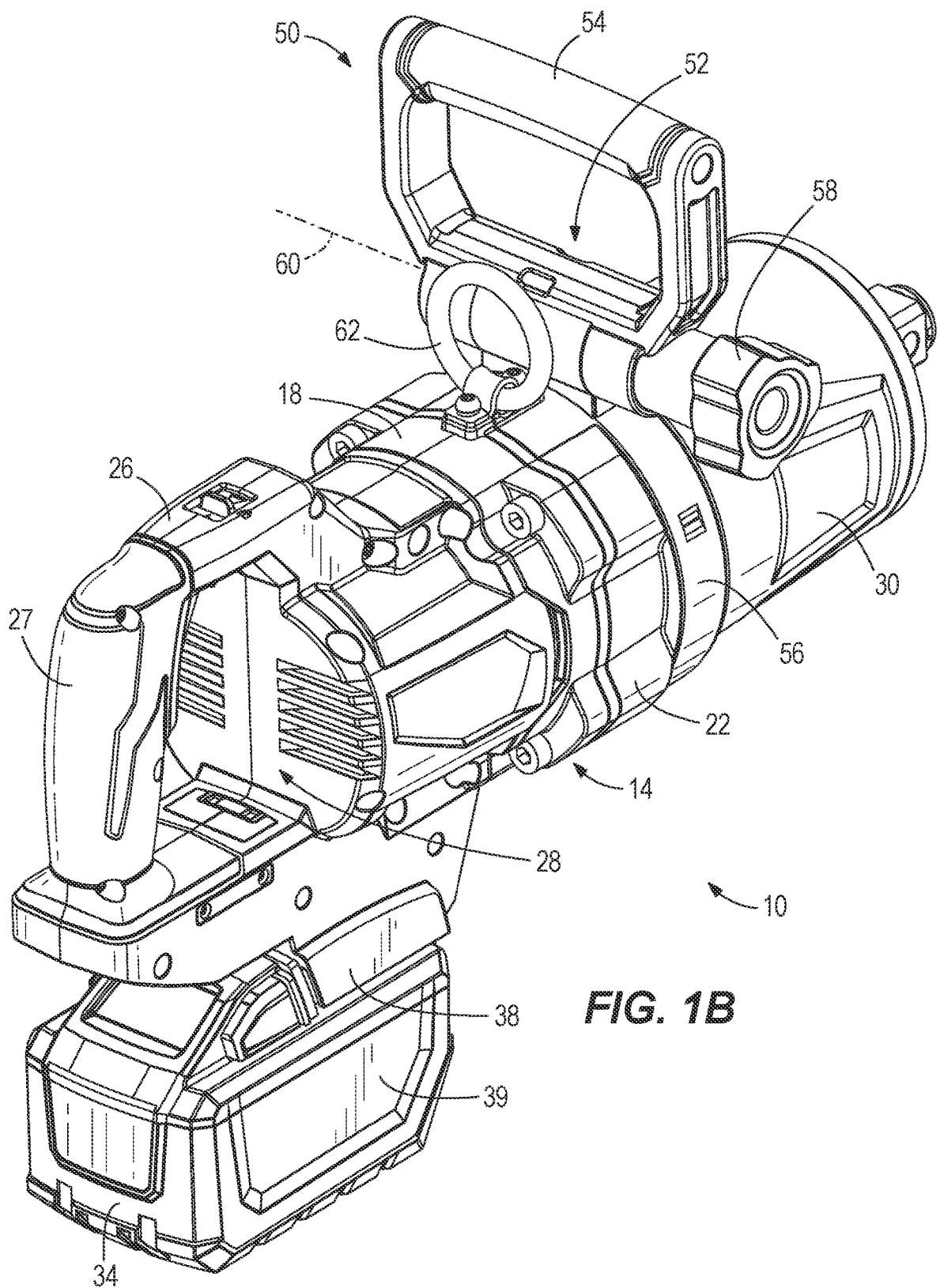

FIGS. 1A and 1B illustrate a power tool in the form of an impact tool or impact wrench 10. The impact wrench 10 includes a housing 14 with a motor housing portion 18, a front housing portion 22 coupled to the motor housing portion 18 (e.g., by a plurality of fasteners), and a generally D-shaped handle portion 26 disposed rearward of the motor housing portion 18. The handle portion 26 includes a grip 27 that can be grasped by a user operating the impact wrench 10. The grip 27 is spaced from the motor housing portion 18 such that an aperture 28 is defined between the grip 27 and the motor housing portion 18. In the illustrated embodiment, the handle portion 26 and the motor housing portion 18 are defined by cooperating clamshell halves, and the front housing portion 22 is a unitary body. In some embodiments, a rubber boot or end cap 30 may cover a front end of the front housing portion 22 to provide protection for the front housing portion 22. The rubber boot 30 may be permanently affixed to the front housing portion 22 or removable and replaceable.

With continued reference to FIGS. 1A and 1B, the impact wrench 10 is operable with a battery pack 34 removably coupled to a battery receptacle 38 located at a bottom end of the handle portion 26 (i.e. generally below the grip 27). The battery pack 34 includes a housing 39 enclosing a plurality of battery cells (not shown), which are electrically connected to provide the desired output (e.g., nominal voltage, current capacity, etc.) of the battery pack 34. In some embodiments, each battery cell has a nominal voltage between about 3 Volts (V) and about 5 V. The battery pack 34 preferably has a nominal capacity of at least 5 Amp-hours (Ah) (e.g., with two strings of five series-connected battery cells (a "5S2P" pack)). In some embodiments, the battery pack 34 has a nominal capacity of at least 9 Ah (e.g., with three strings of five series-connected battery cells (a "5S3P pack"). The illustrated battery pack 34 has a nominal output voltage of at least 18 V. The battery pack 34 is rechargeable, and the cells may have a Lithium-based chemistry (e.g., Lithium, Lithium-ion, etc.) or any other suitable chemistry.

Figure 2:
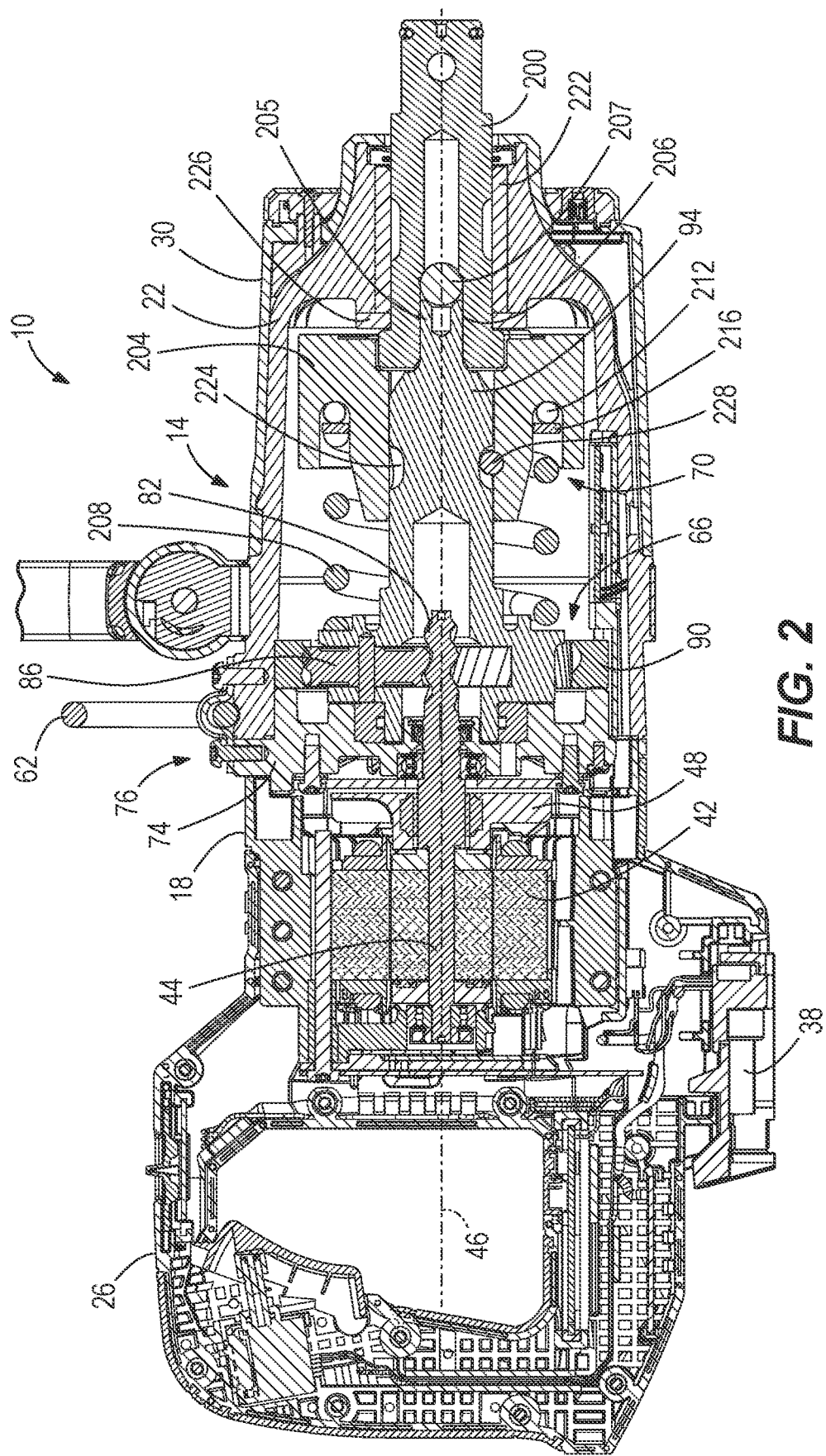
FIG. 2 is a cross-sectional view of the impact wrench of FIG. 1A, taken along line 2-2 of FIG. 1A.

Referring to FIG. 2, an electric motor 42, supported within the motor housing portion 18, receives power from the battery pack 34 (FIG. 1A) when the battery pack 34 is coupled to the battery receptacle 38. The illustrated motor 42 is a brushless direct current ("BLDC") motor with a rotor or output shaft 44 that is rotatable about an axis 46. A fan 48 is coupled to the output shaft 44 (e.g., via a splined connection) adjacent a front end of the motor 42.

In some embodiments, the impact wrench 10 may include a power cord for electrically connecting the motor 42 to a source of AC power. As a further alternative, the impact wrench 10 may be configured to operate using a different power source (e.g., a pneumatic power source, etc.). The battery pack 34 is the preferred means for powering the impact wrench 10, however, because a cordless impact wrench advantageously requires less maintenance (e.g., no oiling of air lines or compressor motor) and can be used in locations where compressed air or other power sources are unavailable.

Referring to FIGS. 1A and 1B, the illustrated impact wrench 10 further includes a second handle 50 coupled to a second handle mount 52. The second handle 50 is a generally U-shaped handle with a central grip portion 54, which may be covered by an elastomeric overmold. The second handle mount 52 includes a band clamp 56 that surrounds the front housing portion 22. The second handle mount 52 also includes an adjustment mechanism 58. The adjustment mechanism 58 can be loosened to permit adjustment of the second handle 50. In particular, the second handle 50 is rotatable about an axis 60 when the adjustment mechanism 58 is loosened. In some embodiments, loosening the adjustment mechanism 58 may also loosen the band clamp 56 to permit rotation of the second handle 50 and the second handle mount 52 about the axis 60. The impact wrench 10 also includes a suspending ring 62 coupled to the front housing portion 22 for hanging the impact wrench 10 from a weight bearing member (e.g., a hook) while not in use.

With reference to FIG. 2, the impact wrench 10 further includes a gear assembly 66 coupled to the motor output shaft 44 and a drive assembly 70 coupled to an output of the gear assembly 66. The gear assembly 66 is supported within the housing 14 by a support 74, which is coupled between the motor housing portion 18 and the front housing portion 22 in the illustrated embodiment. The support 74 separates the interior of the motor housing portion 18 from the interior of the front housing portion 22, and the support 74 and the front housing portion 22 collectively define a gear case 76, with the support 74 defining the rear wall of the gear case 76. The gear assembly 66 may be configured in any of a number of different ways to provide a speed reduction between the output shaft 44 and an input of the drive assembly 70.

The illustrated gear assembly 66 includes a helical pinion 82 formed on the motor output shaft 44, a plurality of helical planet gears 86, and a helical ring gear 90. The output shaft 44 extends through the support 74 such that the pinion 82 is received between and meshed with the planet gears 86. The helical ring gear 90 surrounds and is meshed with the planet gears 86 and is rotationally fixed within the gear case 76 (e.g., via projections (not shown) on an exterior of the ring gear 90 cooperating with corresponding grooves (not shown) formed inside front housing portion 22). The planet gears 86 are mounted on a camshaft 94 of the drive assembly 70 such that the camshaft 94 acts as a planet carrier for the planet gears 86.

Accordingly, rotation of the output shaft 44 rotates the planet gears 86, which then advance along the inner circumference of the ring gear 90 and thereby rotate the camshaft 94. The gear assembly 66 provides a gear reduction from the output shaft 44 to the camshaft 94. In some embodiments, the gear assembly 66 may be configured to provide a gear ratio from the output shaft 44 to the camshaft 94 between 10:1 and 14:1; however, the gear assembly 66 may also be configured to provide other gear ratios.

With continued reference to FIG. 2, the drive assembly 70 includes an anvil 200, extending from the front housing portion 22, to which a tool element (e.g., a socket; not shown) can be coupled for performing work on a workpiece (e.g., a fastener). The drive assembly 70 is configured to convert the continuous rotational force or torque provided by the motor 42 and gear assembly 66 to a striking rotational force or intermittent applications of torque to the anvil 200 when the reaction torque on the anvil 200 (e.g., due to engagement between the tool element and a fastener being worked upon) exceeds a certain threshold. In the illustrated embodiment of the impact wrench 10, the drive assembly 70 includes the camshaft 94, a hammer 204 supported on and axially slidable relative to the camshaft 94, and the anvil 200.

The camshaft 94 includes a cylindrical projection 205 adjacent the front end of the camshaft 94. The cylindrical projection 205 is smaller in diameter than the remainder of the camshaft 94 and is received within a pilot bore 206 extending through the anvil 200 along the axis 46. The engagement between the cylindrical projection 205 and the pilot bore 206 rotationally and radially supports the front end of the camshaft 94. A ball bearing 207 is seated within the pilot bore 206. The cylindrical projection abuts the ball bearing 207, which acts as a thrust bearing to resist axial loads on the camshaft 94.

The drive assembly 70 further includes a spring 208 biasing the hammer 204 toward the front of the impact wrench 10 (i.e., in the right direction of FIG. 3). In other words, the spring 208 biases the hammer 204 in an axial direction toward the anvil 200, along the axis 46. A thrust bearing 212 and a thrust washer 216 are positioned between the spring 208 and the hammer 204. The thrust bearing 212 and the thrust washer 216 allow for the spring 208 and the camshaft 94 to continue to rotate relative to the hammer 204 after each impact strike when lugs (not shown) on the hammer 204 engage and impact corresponding anvil lugs to transfer kinetic energy from the hammer 204 to the anvil 200.

The camshaft 94 further includes cam grooves 224 in which corresponding cam balls 228 are received. The cam balls 228 are in driving engagement with the hammer 204 and movement of the cam balls 228 within the cam grooves 224 allows for relative axial movement of the hammer 204 along the camshaft 94 when the hammer lugs and the anvil lugs are engaged and the camshaft 94 continues to rotate. A bushing 222 is disposed within the front housing portion 22 to rotationally support the anvil 200. A washer 226, which in some embodiments may be an integral flange portion of bushing 222, is located between the anvil 200 and a front end of the front housing portion 22. In some embodiments, multiple washers 226 may be provided as a washer stack.

In operation of the impact wrench 10, an operator activates the motor 42 (e.g., by depressing a trigger), which continuously drives the gear assembly 66 and the camshaft 94 via the output shaft 44. As the camshaft 94 rotates, the cam balls 228 drive the hammer 204 to co-rotate with the camshaft 94, and the hammer lugs engage, respectively, driven surfaces of the anvil lugs to provide an impact and to rotatably drive the anvil 200 and the tool element. After each impact, the hammer 204 moves or slides rearward along the camshaft 94, away from the anvil 200, so that the hammer lugs disengage the anvil lugs 220.

As the hammer 204 moves rearward, the cam balls 228 situated in the respective cam grooves 224 in the camshaft 94 move rearward in the cam grooves 224. The spring 208 stores some of the rearward energy of the hammer 204 to provide a return mechanism for the hammer 204. After the hammer lugs disengage the respective anvil lugs, the hammer 204 continues to rotate and moves or slides forwardly, toward the anvil 200, as the spring 208 releases its stored energy, until the drive surfaces of the hammer lugs re-engage the driven surfaces of the anvil lugs to cause another impact.

With reference to FIG. 3, the housing 14 of the battery pack 34 includes two opposed sidewalls 250, a top wall 252 extending between the sidewalls 250 and defining an upper surface 254, and a connecting structure 256 projecting upward from the upper surface 254. The connecting structure 256 includes an end wall 258 and a pair of opposed rails 260 projecting laterally outward from the connecting structure 256 in a direction of the two sidewalls 250. Channels 262 are defined between each rail 260 and the upper surface 254 of the top wall 252. The connecting structure 256 also includes a terminal block 264 with device contacts (not shown) configured to mechanically and electrically interface with the impact wrench 10 to transfer electrical power and communication signals therebetween. The battery pack 34 also includes a latching mechanism 266 to facilitate coupling of the battery pack 34 to the battery receptacle 38. The latching mechanism 266 includes a pair of latches 268 each having a hook portion 270 and a button portion 272 actuable to move the hook portion 270 from a locking position to a release position to selectively release the battery pack 34 from the battery receptacle 38.

With reference to FIG. 4, the illustrated battery receptacle 38 is an isolated battery receptacle 38 configured to attenuate the transmission of vibration to the battery pack 34 due to vibrational forces acting along the longitudinal direction of the impact wrench 10 during operation. The isolated battery receptacle 38 includes an isolation member 274 coupled to the handle portion 26 of the housing 14 and configured to secure the battery pack 34 to the impact wrench 10. The isolation member 274 includes a cavity 276 defined by a pair of sidewalls 278, a top wall 280 extending between the sidewalls 278 and defining a lower surface 282, and an end wall 284. The isolation member 274 also includes a front wall 286, and a pair of opposed rails 288 that project laterally inward from the sidewalls 278 into the cavity 276. Channels 290 are defined between each rail 288 and the lower surface 282. Each rail 288 includes a locking groove 292 located adjacent the front wall 286 for receiving the hook portion 270 when the battery pack 34 is coupled to the isolated battery receptacle 38. The top wall 280 of the isolation member 274 includes an aperture 294 (FIGS. 5A and 5B), and a terminal block 296 of the impact wrench 10 (FIG. 4) is received through the aperture 294 and resides within the cavity 276.

To couple the battery pack 34 to the isolated battery receptacle 38, the connecting structure 256 of the battery pack 34 is slid into the cavity 276 of the isolation member 274 so that the rails 260, 288 slide into the corresponding channels 290, 262. The connecting structure 256 continues to slide into the cavity 276 until the end wall 258 contacts and abuts the front wall 286, at which point the hook portions 270 of the latching mechanism 266 engage the locking grooves 292 to secure the battery pack 34 to the isolated battery receptacle 38. To remove the battery pack 34, the button portions 272 of the latching mechanism 266 are depressed to release the hook portions 270 from the locking grooves 292, and the connecting structure 256 is slid back out of the cavity 276 along a direction opposite to the insertion direction.

Figure 5A:
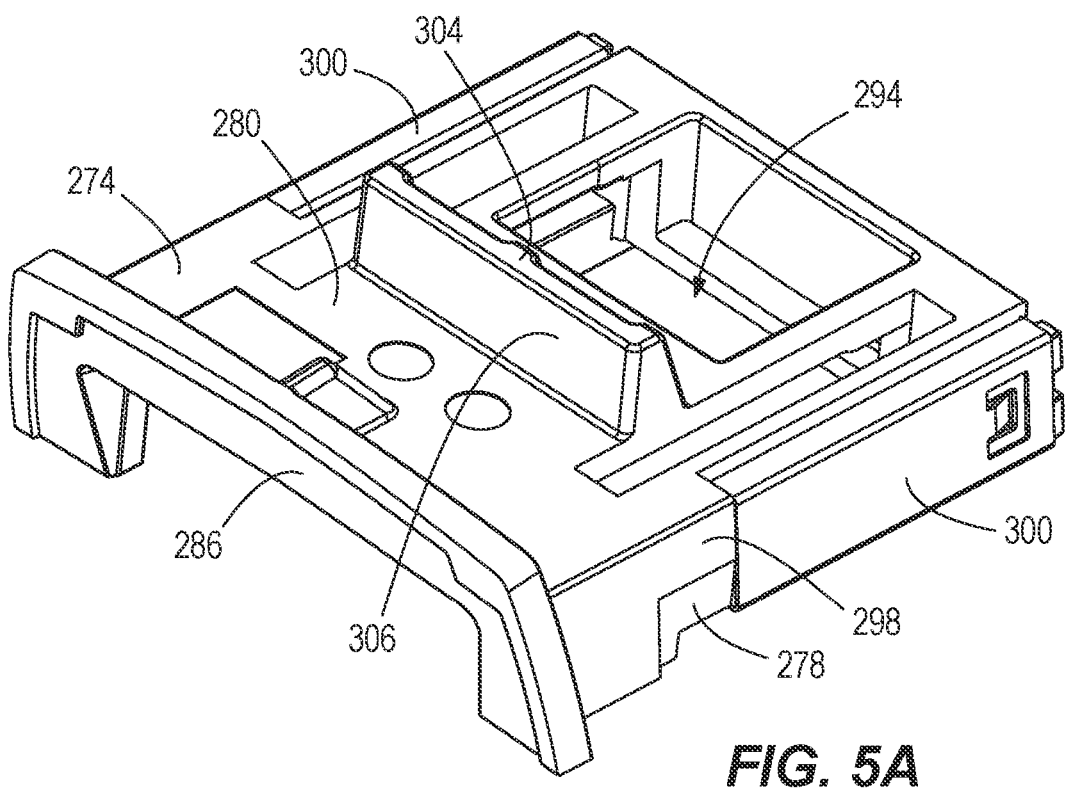
FIGS. 5A and 5B are perspective views illustrating an isolation member of the battery receptacle of FIG. 4.
Figure 5B:
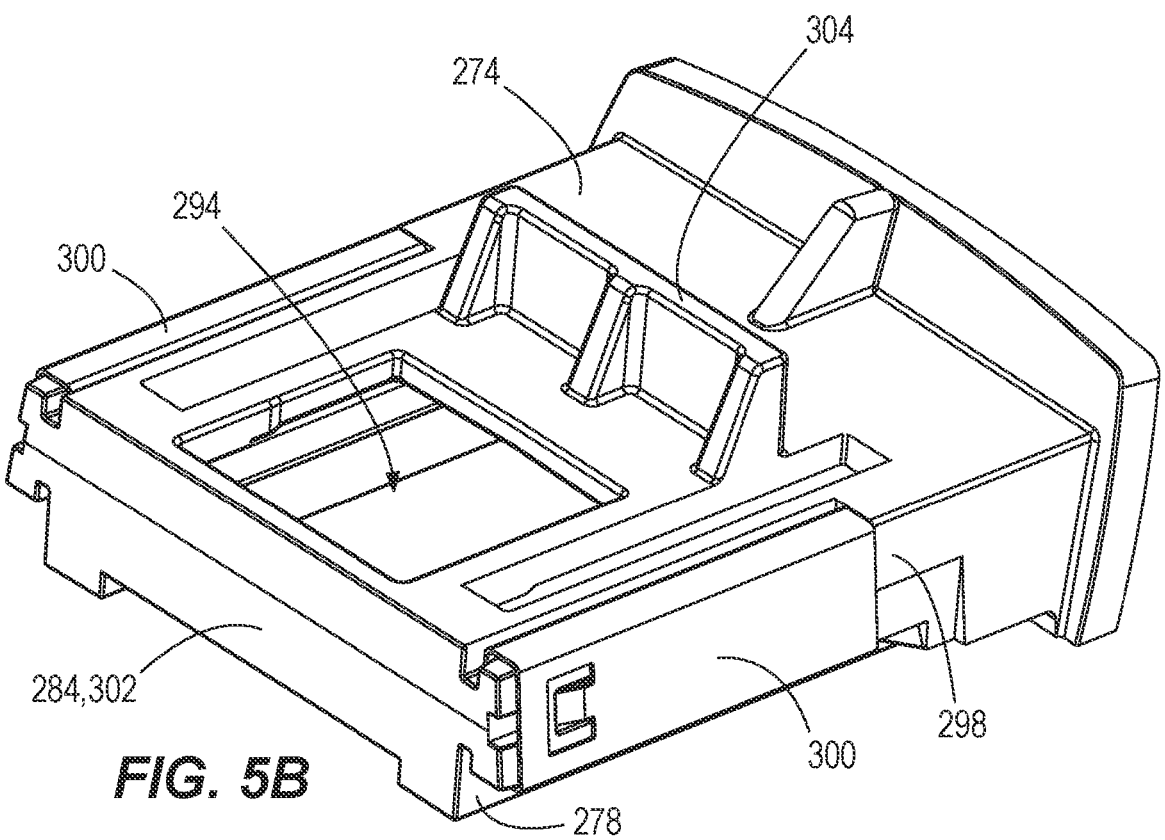
Figure 6:
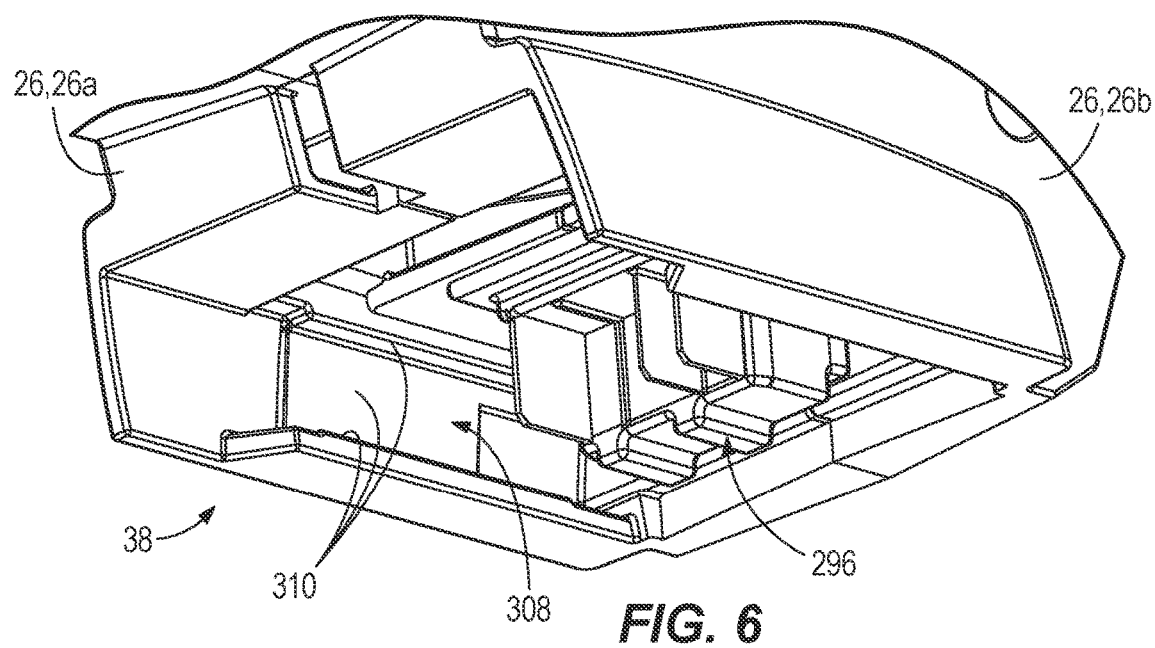
FIG. 6 is a perspective view of the battery receptacle of FIG. 4 with portions removed.
Figure 7:
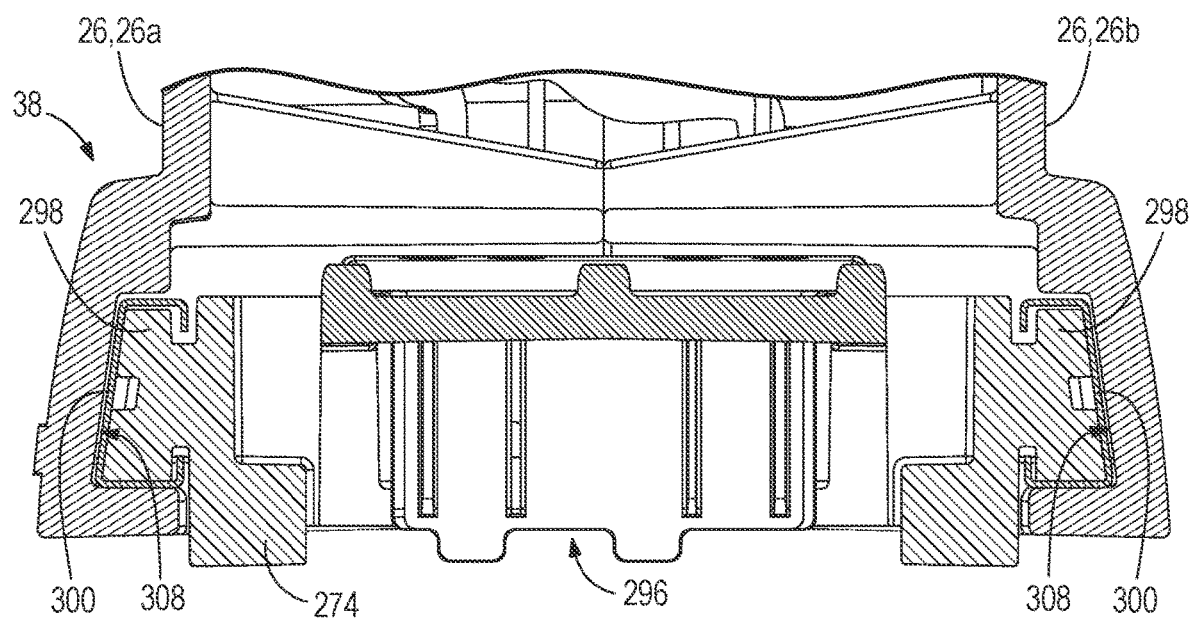
FIG. 7 is a cross-sectional view of the battery receptacle of FIG. 4, taken along line 7-7 of FIG. 4.
Figure 8:
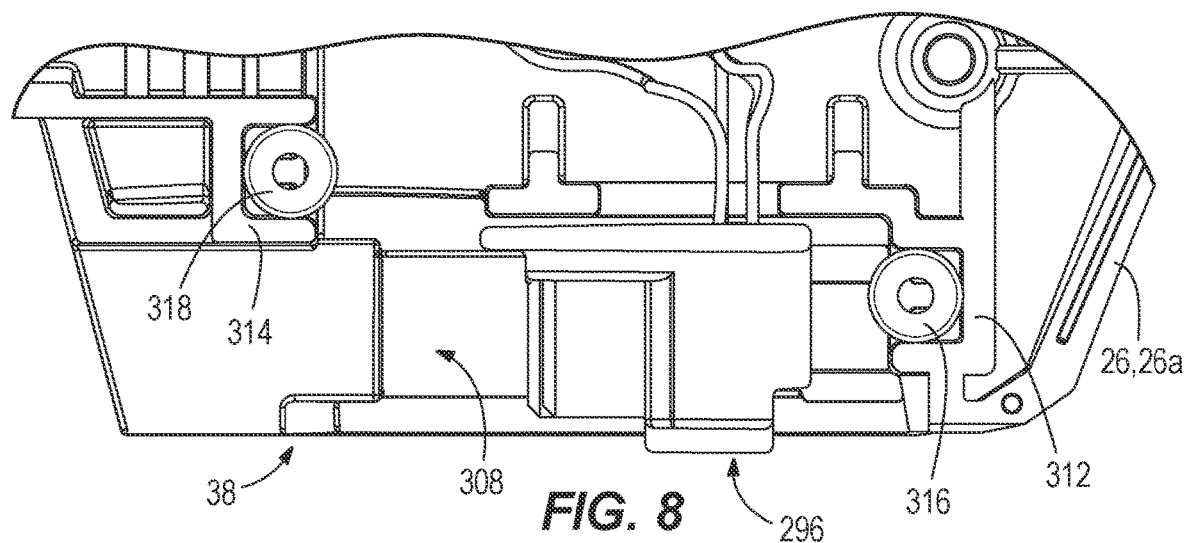
FIG. 8 is a plan view of the battery receptacle of FIG. 4 with portions removed.
Figure 9:
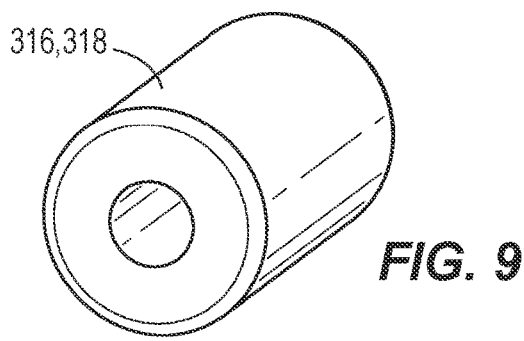
FIG. 9 is a perspective view of a damper of the battery receptacle of FIG. 4.
Figure 10:
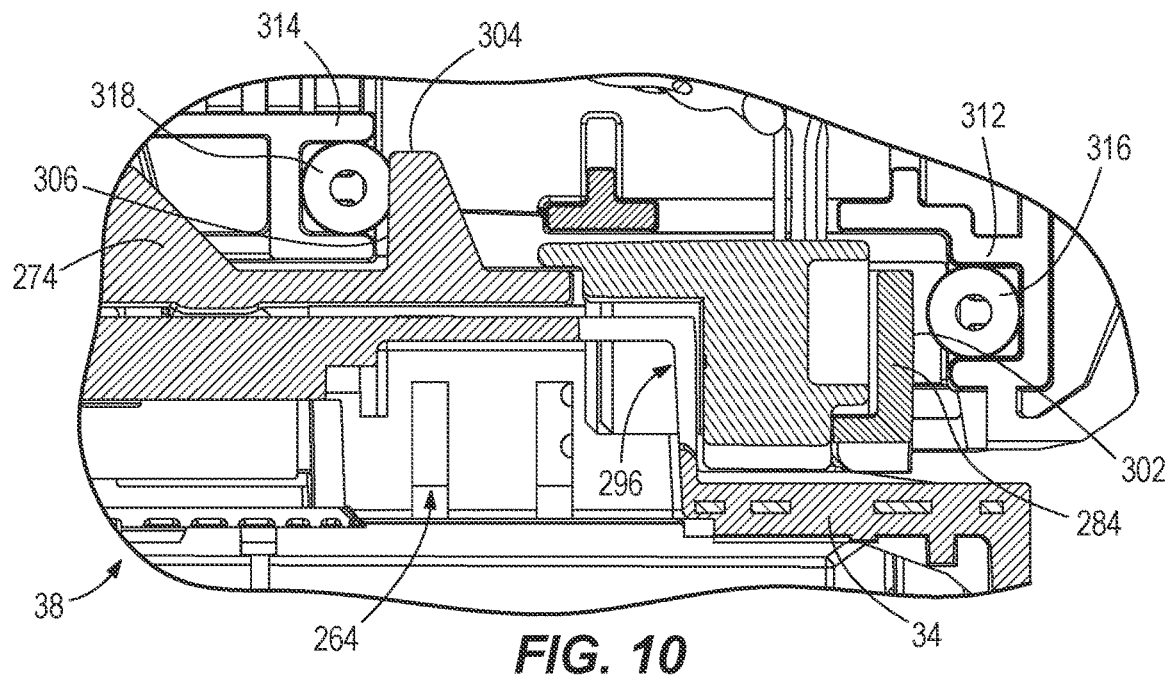
FIG. 10 is a detailed cross-sectional view of the battery receptacle of FIG. 4 with the battery pack of FIG. 3 coupled thereto, taken along line 2-2 of FIG. 1A.

With reference to FIGS. 5A and 5B, the isolation member 274 includes a pair of opposed slide rails 298 projecting laterally outward from the sidewalls 278. A friction member 300 having a U-shaped cross-section is coupled to each slide rail 298. The friction members 300 are formed from a material (e.g., steel) selected to reduce a coefficient of friction between sliding surfaces of the friction member 300 and the handle portion 26 of the housing 14, as will be further described below, thus reducing wear. The end wall 284 defines a first stop surface 302, and the isolation member 274 includes a projection 304 protruding upward from the top wall 280 and defining a second stop surface 306 facing opposite the first stop surface 302.

With reference to FIGS. 6-10, the handle portion 26 includes cooperating clamshell halves 26a, 26b each including a slide channel 308 formed within the isolated battery receptacle 38. Each slide channel 308 is defined by sliding surfaces 310 (FIG. 6) of each clamshell half 26a, 26b and configured to slidingly engage the slide rails 298 of the isolation member 274. Each clamshell half 26a, 26b also includes a first damper seat 312 (FIG. 8) opening toward the rear of the impact wrench 10 (i.e., toward the grip 27), and an opposed second damper seat 314 opening toward the front of the impact wrench 10 (i.e., toward the anvil 200). The first and second damper seats 312, 314 are configured to receive first and second elastomeric dampers 316, 318 (FIG. 9) that oppose the first and second stop surfaces 302, 306 of the isolation member 274. In the illustrated embodiment, the dampers 316, 318 are cylindrically-shaped, although other shapes are also contemplated (e.g., prismatic).

During operation of the impact wrench 10, the handle portion 26 can oscillate due to vibration transmitted to the handle portion 26 from the front housing portion 22 and the motor housing portion 18. A component of the oscillatory motion of the handle portion 26 is experienced in the longitudinal direction of the impact wrench 10, i.e., along the direction of the axis 46 (FIG. 2). As the handle portion 26 translates along the longitudinal direction, the inertia of the battery pack 34 causes the battery pack 34 to resist this motion. Because the battery pack 34 is secured to the isolation member 274, the isolation member 274 likewise resists motion in the longitudinal direction. Accordingly, the slide rails 298 slide within the slide channels 308 along the longitudinal direction, until one of the stop surfaces 302, 306 reaches and impacts a corresponding damper 316, 318. The dampers 316, 318 attenuate the transmission of vibration to the stop surfaces 302, 306, thus reducing the magnitude of vibrational forces acting on the battery pack 34. The friction members 300 reduce the sliding friction between the slide rails 298 and the sliding surfaces 310, thus reducing wear and extending the life of the impact wrench 10 and battery pack 34.

Figure 11:
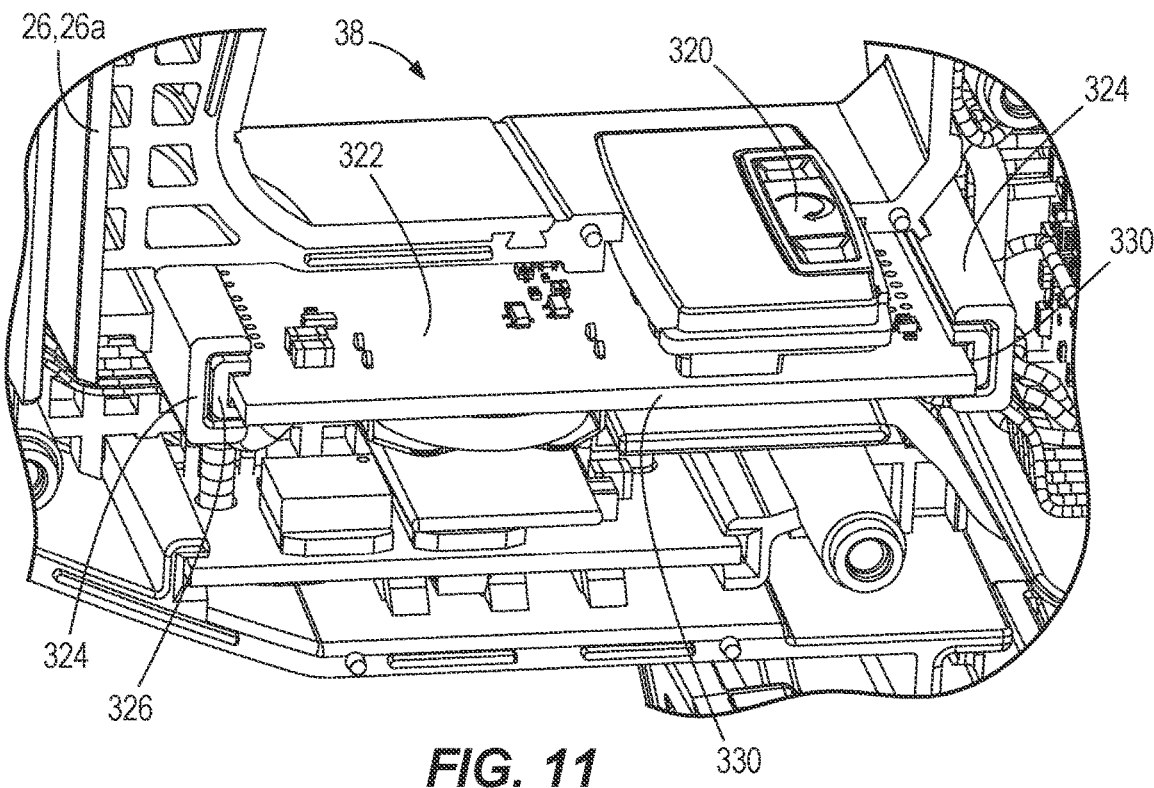
FIG. 11 is a detailed perspective view of the impact wrench of FIG. 1A with portions removed.
Figure 12:
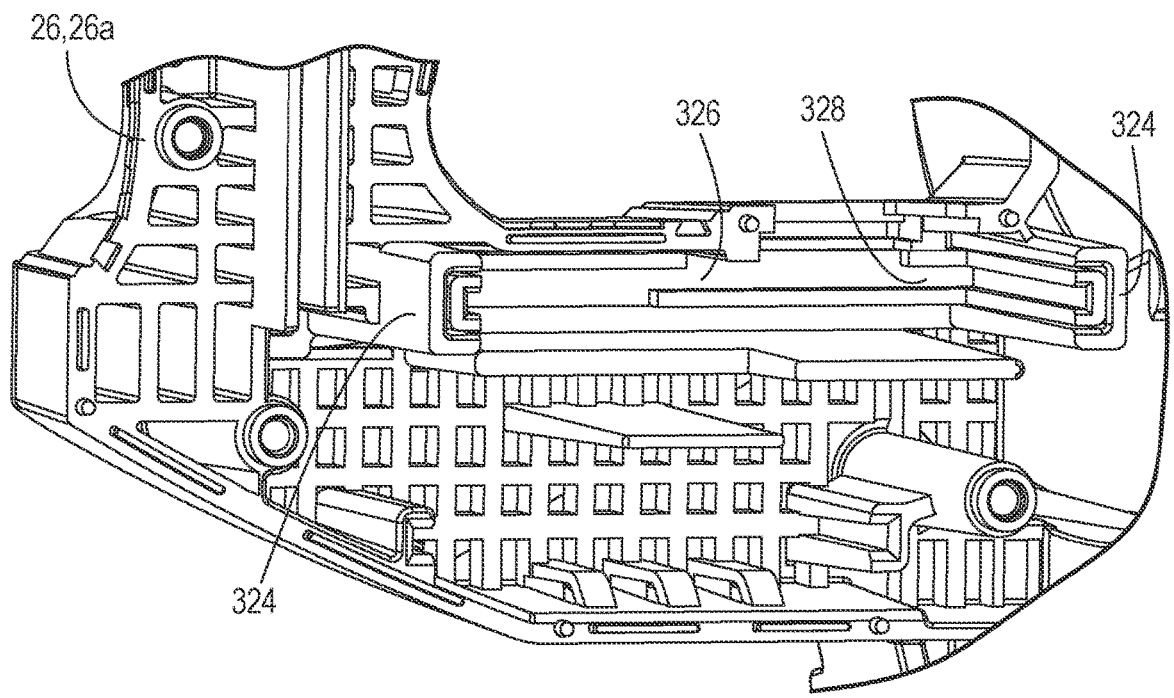
FIG. 12 is a detailed perspective view of a clamshell half of the impact wrench of FIG. 1A.

With reference to FIGS. 11 and 12, the impact wrench 10 also includes a speed selection switch 320 actuable to adjust a rotational speed of the impact wrench 10. The speed selection switch 320 is coupled to a speed selection printed circuit board (PCB) 322 that receives inputs from the speed selection switch 320. The speed selection PCB 322 is supported within a U-shaped channel 324 formed in the first clamshell half 26a. A U-shaped elastomeric damper 326 is received into the U-shaped channel 324 and defines a groove 328. In the illustrated embodiment, the speed selection PCB 322 is rectangular in shape and includes four edges 330. The speed selection PCB 322 is received into the groove 328 of the damper 326 so that three of the four edges 330 engage the damper 326, while the fourth edge 330 resides outside the U-shaped channel 324. The damper 326 attenuates transmission of vibration from the handle portion 26 to the speed selection PCB 322 along three orthogonal directions (i.e., along the longitudinal direction, along a lateral direction perpendicular to the longitudinal direction and extending between the clamshell halves 26a, 26b, and along a vertical direction orthogonal to the longitudinal and lateral directions).

FIGS. 13-16D illustrate a battery receptacle 38' and isolation member 274' according to another embodiment, which may be incorporated into the impact wrench 10 described above with reference to FIGS. 1-12. Features and elements of the battery receptacle 38' and the isolation member 274' corresponding with features and elements of the battery receptacle 38 and isolation member 274 described above are given identical reference numbers, appended by a prime symbol.

Figure 13:
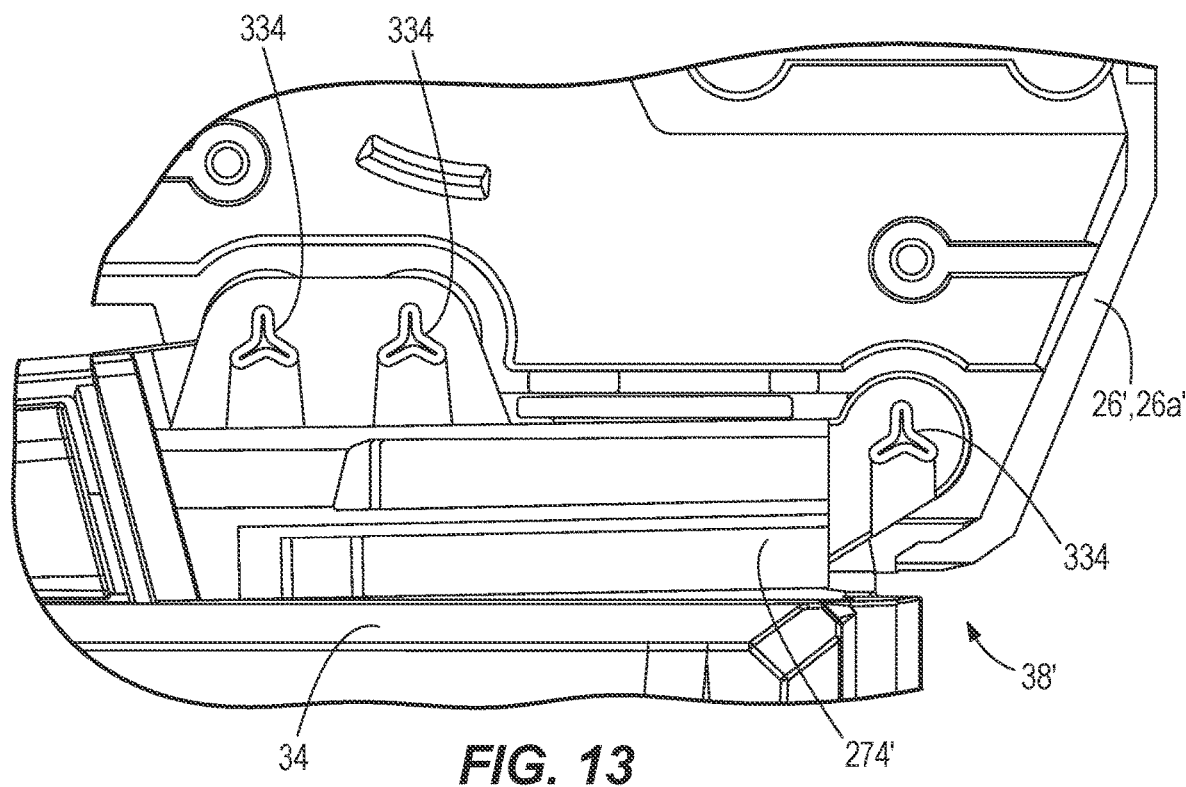
FIG. 13 is a plan view of a battery receptacle according to another embodiment, with portions removed.
Figure 14:
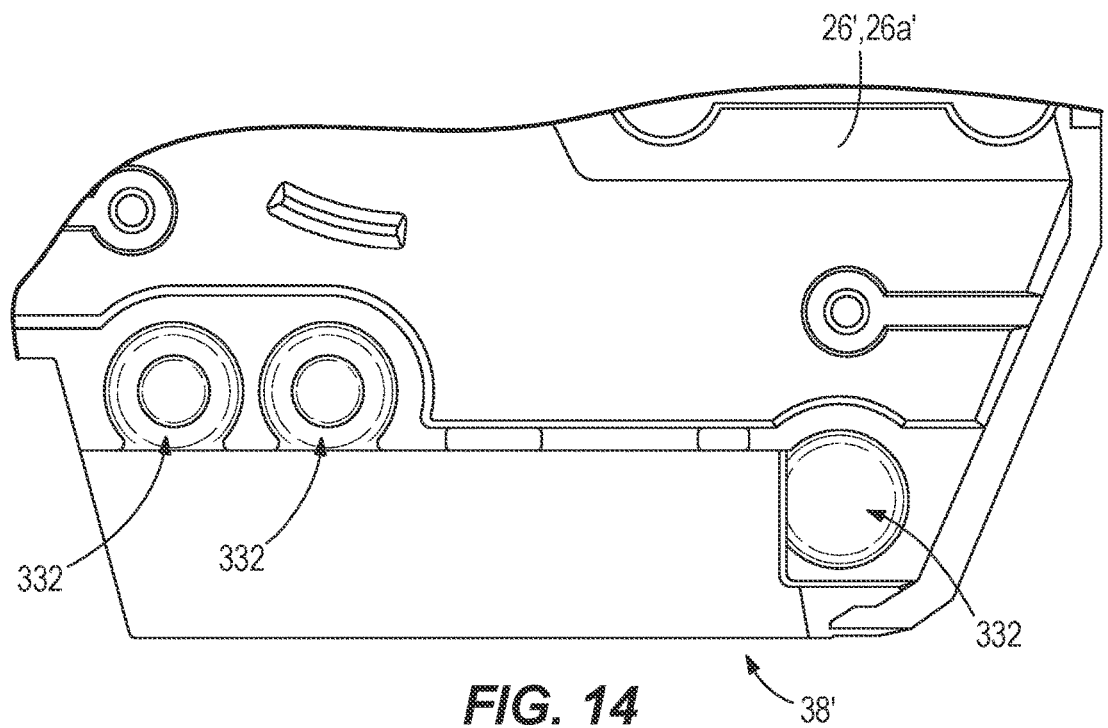
FIG. 14 is another plan view of the battery receptacle of FIG. 13 with portions removed.

With reference to FIGS. 13-15, like the isolation member 274 described above, the isolation member 274' is configured to selectively and detachably couple to the battery pack 34 and is further supported by the battery receptacle 38'. The isolation member 274' likewise includes a cavity 276' defined by a pair of sidewalls 278', a top wall 280' extending between the sidewalls 278', and an end wall 284'. The top wall 280' of the isolation member 274' includes an aperture 294', and the terminal block 296 of the impact wrench 10 is received through the aperture 294' and resides within the cavity 276'. To couple the battery pack 34 to the isolated battery receptacle 38', the connecting structure 256 of the battery pack 34 is slid into the cavity 276' of the isolation member 274' in a similar manner to that previously described. Unlike the isolation member 274, the isolation member 274' does not couple to the battery receptacle 38' by sliding engagement between slide rails and corresponding slide channels. Instead, the isolation member 274' is a floating isolation member 274' that couples to the battery receptacle 38' in a manner that permits relative motion between the battery receptacle 38' and the isolation member 274' in all directions to attenuate vibration transmitted from the battery receptacle 38' to the isolation member 274'.

The battery receptacle 38' includes cup-shaped damper pockets 332 (FIG. 14) formed in each clamshell half 26a', 26b'. The isolation member 274' includes damper posts 334 (FIG. 13) projecting laterally outward and configured to be received by cup-shaped elastomeric dampers 336 (FIG. 15). The isolation member 274' includes a first central ridge 339 protruding from the top wall 280 and a second central ridge 341 protruding from the end wall 284'. The damper posts 334 project laterally outward from each of the first central ridge 339 and the second central ridge 341. Each cup-shaped damper 336 has an open end 338 that receives the damper post 334, and a closed bottom 340 that is received into the damper pocket 332. Accordingly, the dampers 336 are positioned between the damper posts 334 and the damper pockets 332 and attenuate vibration transmitted from the battery receptacle 38' to the isolation member 274' and the battery pack 34. Specifically, the dampers 336 permit some degree of relative motion between the damper posts 334 and the damper pockets 332 in both the axial and radial directions of the damper posts 334. Accordingly, the transmission of vibration to the battery pack 34 is attenuated in three orthogonal directions (i.e., along the longitudinal, lateral, and vertical directions of the impact wrench 10). In the illustrated embodiment, each side of the battery receptacle 38' includes three damper pockets 332 corresponding to three damper posts 334 of the isolation member 274'. In other embodiments, there may be fewer damper posts 334 and corresponding damper pockets 332 on each side (e.g., one or two) or more (e.g., four, five, etc.).

FIGS. 16A-16D show alternative embodiments of the dampers 336. Each of the dampers 336 of FIGS. 16A-16D includes a central bore 341 having a Y-shaped cross-section corresponding to a Y-shaped cross-section of the damper posts 334. The damper 336 shown in FIG. 16A includes the closed bottom 340. The damper 336 shown in FIG. 16B is open at both ends, and includes peripheral bores 342 that decrease an amount of material of the damper 336 and soften the elasticity of the damper 336. The damper 336 shown in FIG. 16C includes indented walls 344. The damper 336 shown in FIG. 16D includes a closed bottom and peripheral openings 346.

Figure 17:
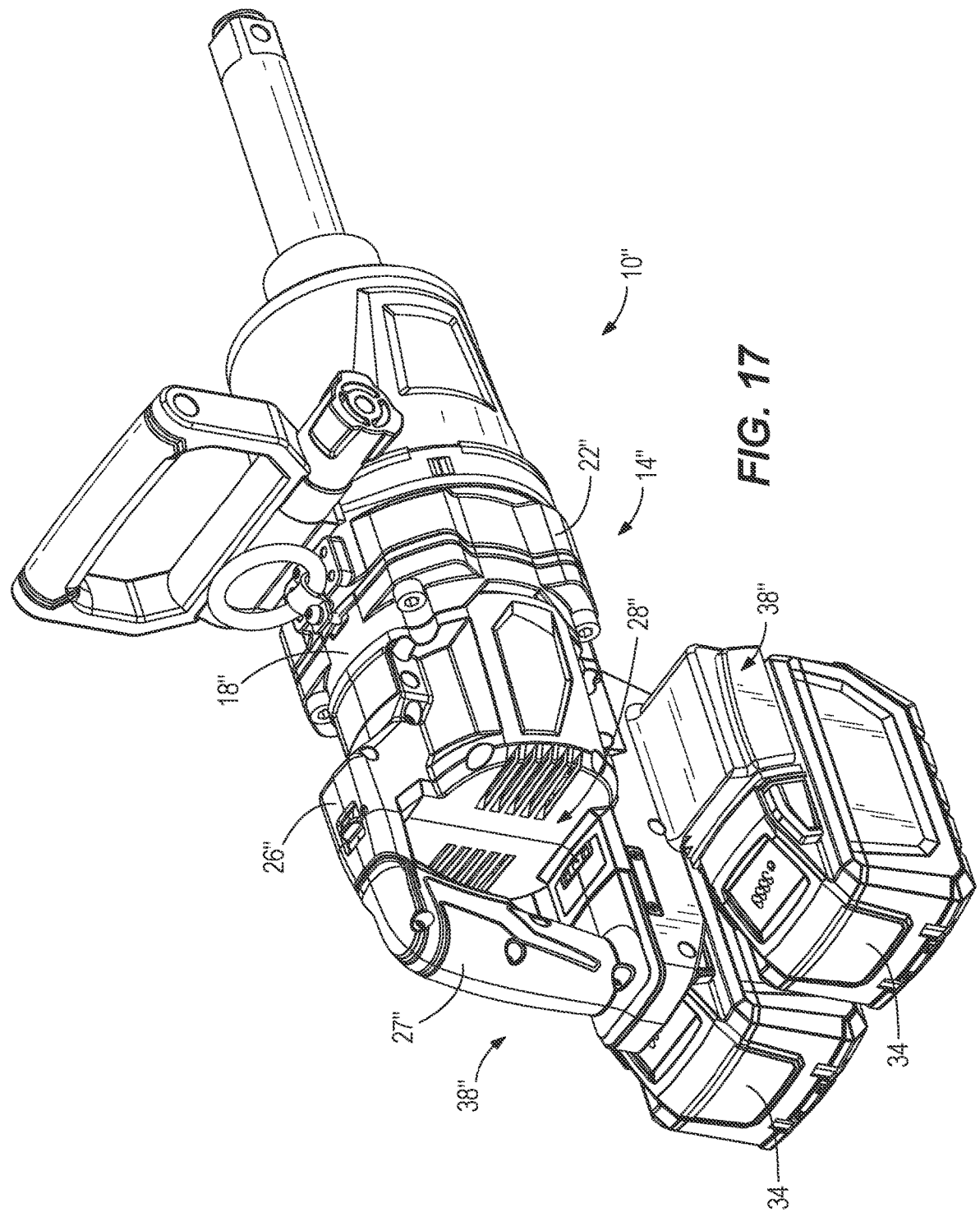
FIG. 17 is a perspective view of an impact wrench according to another embodiment, the impact wrench including two battery receptacles for receiving two battery packs.
Figure 18:
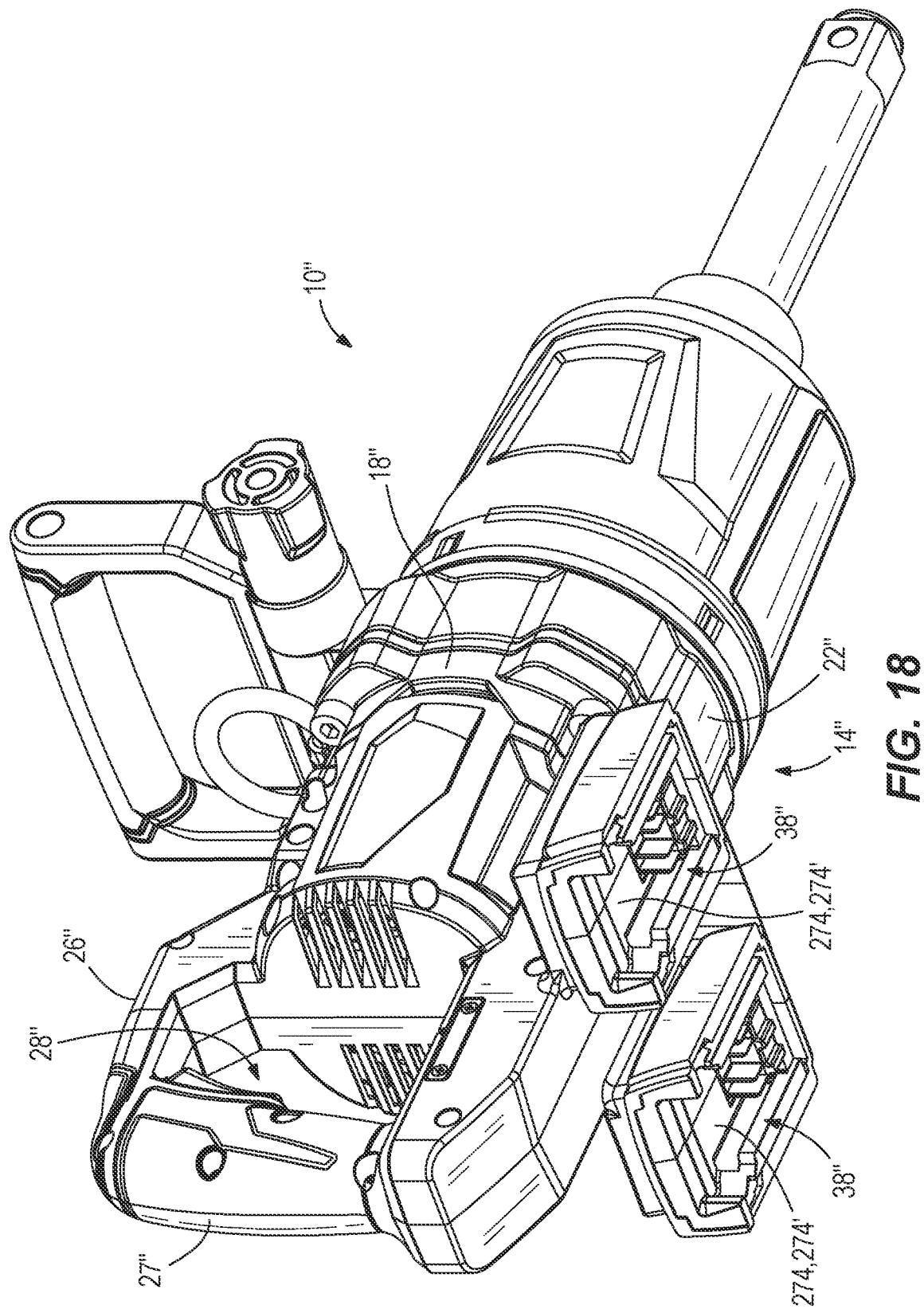
FIG. 18 is another perspective view of the impact wrench of FIG. 17.

FIGS. 17 and 18 illustrate an impact wrench 10" according to another embodiment. The impact wrench 10" includes much of the same structure and many of the same features as the impact wrench 10 described above with respect to FIGS. 1-16D. Features and elements of the impact wrench 10" corresponding with features and elements of the impact wrench 10 are given identical reference numbers, appended by two prime symbols.

The impact wrench 10″ includes a housing 14″ with a motor housing portion 18″, a front housing portion 22″ coupled to the motor housing portion 18″ (e.g., by a plurality of fasteners), and a generally D-shaped handle portion 26″ disposed rearward of the motor housing portion 18″. The handle portion 26″ includes a grip 27″ that can be grasped by a user operating the impact wrench 10″. The grip 27″ is spaced from the motor housing portion 18″ such that an aperture 28″ is defined between the grip 27″ and the motor housing portion 18″.

The handle portion 26″ includes two battery receptacles 38″ located at a bottom end of the handle portion 26″ (i.e. generally below the grip 27″). Each battery receptacle 38″ is configured to selectively and detachably couple to the battery pack 34, so that two battery packs 34 may be simultaneously coupled to the impact wrench 10″. Either of the isolation members 274, 274' may be incorporated into either of the battery receptacles 38″ to facilitate coupling of the battery packs 34 to the battery receptacles 38″, and to attenuate vibration transmitted to the battery packs 34 during operation of the impact wrench 10″.

As discussed above, the illustrated battery pack 34 has a nominal output voltage of at least 18 V. When two battery packs 34 are coupled to the impact wrench 10″ as shown in FIG. 17, the two battery packs 34 may cooperate to supply a combined nominal output voltage of at least 36 V to the impact wrench 10″. Alternatively, the impact wrench 10″ may instead draw power only from one battery pack 34 at a time, and may intermittently switch power sources between the two coupled battery packs 34 so that an effective nominal capacity of the combined battery packs 34 is doubled (e.g., from at least 5 Ah to at least 10 Ah).

Various features of the disclosure are set forth in the following claims.

What is claimed is:

1. An impact tool comprising:
   an electric motor;
   a housing containing the electric motor and including a first damper seat and a second damper seat; and
   a battery receptacle including
      an isolation member configured to selectively and detachably couple to a battery pack to electrically connect the battery pack to the electric motor, the isolation member including opposed rails configured to be received into sliding engagement with channels formed in the housing, an end wall defining a first stop surface, and a top wall having a projection that defines a second stop surface, and
      a first elastomeric damper supported within the first damper seat of the housing and positioned between the housing and the end wall,
      a second elastomeric damper supported within the second damper seat of the housing and positioned between the housing and the projection,
   wherein during operation of the impact tool, the isolation member is configured to translate relative to the housing and impact the first elastomeric damper and the second elastomeric damper which, in turn, is configured to attenuate transmission of vibration from the housing to the battery pack,
   wherein the first elastomeric damper is configured to attenuate transmission of vibration in a first direction, and
   wherein the second elastomeric damper is configured to attenuate transmission of vibration in a second direction that is opposite the first direction.

2. The impact tool of claim 1, wherein the battery receptacle further includes a pair of friction members, each friction member having a u-shaped cross-section and being coupled to a respective rail of the opposed rails.

3. The impact tool of claim 1, wherein the second stop surface opposes the second elastomeric damper.

4. The impact tool of claim 1, wherein the isolation member includes a pair of sidewalls, and wherein the opposed rails project laterally outward from the sidewalls.

5. The impact tool of claim 4, wherein the pair of sidewalls, the top wall, and the end wall define a cavity configured to receive a connecting structure of the battery pack.

6. The impact tool of claim 1, wherein the housing defines a longitudinal axis, and wherein the rails are configured to slide within the channels along a direction of the longitudinal axis.

7. The impact tool of claim 6, wherein the first damper seat and the second damper seat both open in a direction that extends parallel to the longitudinal axis.

8. The impact tool of claim 1, wherein the first damper seat opens in a first direction and the second damper seat opens in a second direction opposite the first direction.

9. An impact tool comprising:
   an electric motor;
   a housing containing the electric motor; and
   a battery receptacle including
      an isolation member configured to selectively and detachably couple to a battery pack to electrically connect the battery pack to the electric motor, the isolation member including opposed rails configured to be received into sliding engagement with channels formed in the housing,
      a first elastomeric damper supported within the housing and positioned between the housing and the isolation member, and
      a second elastomeric damper supported within the housing and positioned between the housing and the isolation member;
   wherein during operation of the impact tool, the isolation member is configured to translate relative to the housing and impact the first elastomeric damper and the second elastomeric damper which, in turn, is configured to attenuate transmission of vibration from the housing to the battery pack,
   wherein the first elastomeric damper is configured to attenuate transmission of vibration in a first direction, and
   wherein the second elastomeric damper is configured to attenuate transmission of vibration in a second direction that is opposite the first direction.

10. The impact tool of claim 9, wherein the housing defines a longitudinal axis, and wherein the rails are configured to slide within the channels along a direction of the longitudinal axis.

11. The impact tool of claim 10, wherein the first direction and the second direction are oriented parallel to the longitudinal axis.

12. The impact tool of claim 10, wherein the first elastomeric member is positioned in a first damper seat of the housing that opens in the first direction and the second elastomeric member is positioned in a second damper seat of the housing that opens in the second direction.

13. The impact tool of claim 9, wherein the isolation member defines a first stop surface that opposes the first elastomeric damper and a second stop surface that opposes the second elastomeric damper.

14. The impact tool of claim 13, wherein one of the first stop surface and the second stop surface is defined by a rear wall of the isolation member.

15. The impact tool of claim 9, wherein the battery receptacle further includes a pair of friction members, each friction member having a u-shaped cross-section and being coupled to a respective rail of the opposed rails.

\* \* \* \* \*